Dec. 29, 1925.                                                          1,567,216
                              E. A. WATTS
             LUBRICATING THE BORE OF CYLINDERS OF ENGINES
                          Filed Oct. 20, 1924
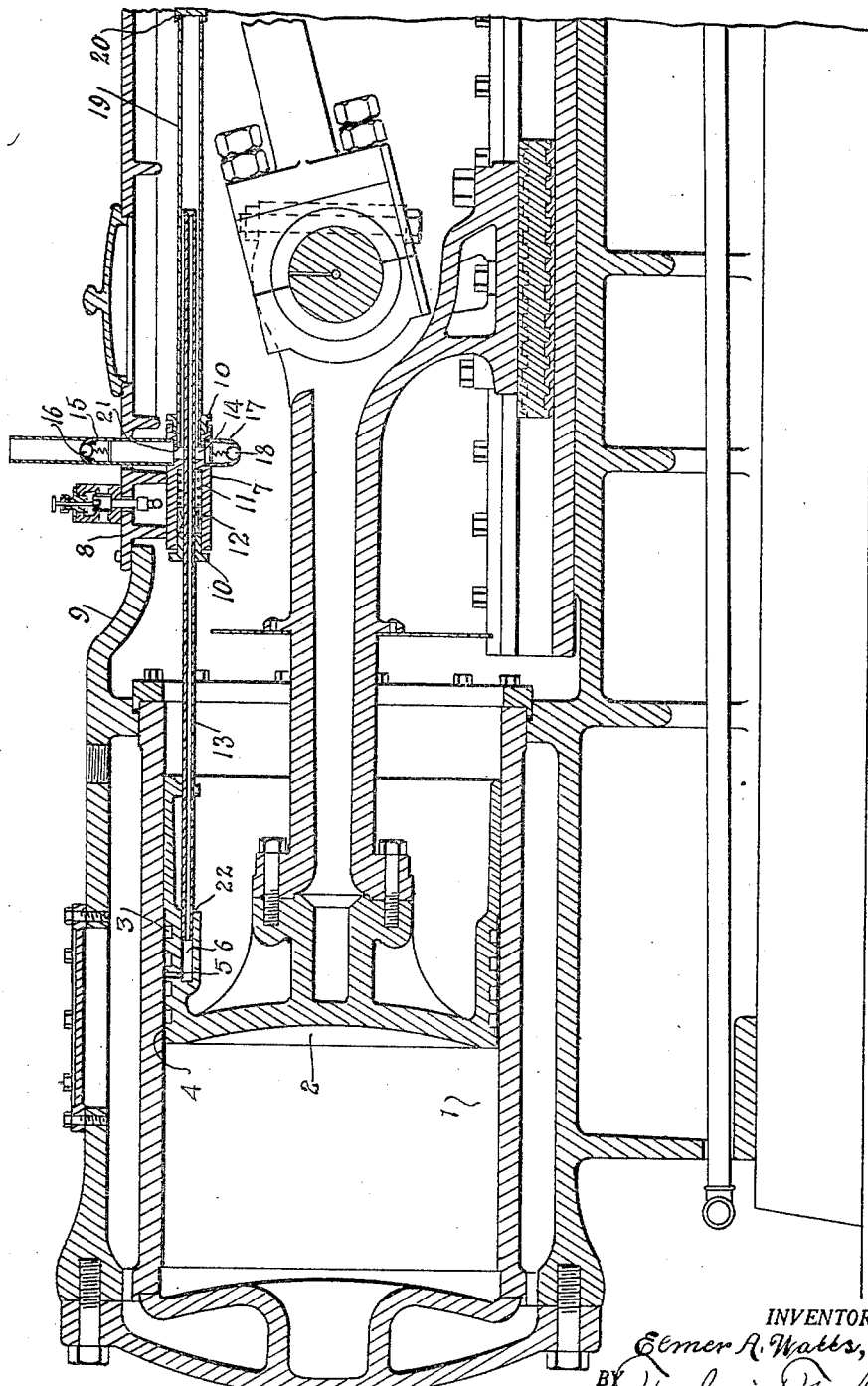
INVENTOR.
Elmer A. Watts,
BY Toulmin & Toulmin
ATTORNEYS.

Patented Dec. 29, 1925.

1,567,216

UNITED STATES PATENT OFFICE.

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO.

LUBRICATING THE BORE OF CYLINDERS OF ENGINES.

Application filed October 20, 1924. Serial No. 744,640.

*To all whom it may concern:*

Be it known that I, ELMER A. WATTS, a citizen of the United States, residing at Springfield, in the county of Clark and State of Ohio, have invented certain new and useful Improvements in Lubricating the Bore of Cylinders of Engines, of which the following is a specification, reference being had therein to the accompanying drawing.

This invention relates to improved means for lubricating the bore of cylinders of engines, more particularly high explosive engines.

The object of the invention is the provision of lubricating means which shall be capable of forcing the lubricant into the bore of the cylinder in attenuated quantities against the resistance offered by the high pressure of the power medium contained in the cylinder of the engine, as, for instance, the high pressure due to the expansion of the explosive charges in high explosive engines.

It is a further object to overcome the resistance offered by this high pressure of the power medium which acts against the ready introduction into the cylinder and between it and its piston of lubricant oils.

By means of my invention I successfully and readily introduce lubricating oils under the conditions named above. These means consist, essentially, of a lubricant pump adapted to receive the lubricant and to draw atmospheric air into contact with the admitted lubricant to cause a vaporization of the lubricant and further adapted to force this now vaporized lubricant into a clearance allowance or space between the engine piston and the walls of the cylinder bore.

By these means I perform the essential functions of lubricant vaporization and forciful introduction of the vaporized lubricant into contact with the surfaces to be lubricated.

In the accompanying drawings the illustration is a longitudinal sectional view of my lubricating mechanism shown in connection with a conventional type of high explosive or gasoline engine with its piston changed to make it combine with the remainder of my mechanism.

The numeral 1 designates the cylinder of any of the numerous types of high explosive engines, commonly called gas engines. Within this cylinder is also the usual piston indicated at 2 but changed in its relation to the bore of the cylinder in that a portion of the length of the piston is given additional clearance between it and the wall of the cylinder bore. The portion I so treat preferably extends throughout so much of the length of the piston as embraces the usual piston rings 3. I indicate the portion in question by the numeral 4. It is reduced in diameter as compared with the diameter of the bore of the cylinder by substantially 1/1000 of an inch for each inch of diameter of the bore. This clearance affords an attenuated space or chamber between the piston and the cylinder wall for the reception and distribution of the lubricant. I form a small passageway 5 for delivering the lubricant to this clearance space, and open this passage into a lubricant chamber 6, these parts being formed in the wall of the piston.

I will now refer to the lubricant mechanism by which the oil and air are to be commingled and the oil vaporized. This mechanism comprises a casing 7 secured preferably to a removable cap 8 which is mounted on a part of the cylinder structure or housing 9. The valve structure shown on the drawing immediately to the right of the cap 8 forms no part of the present invention and is therefore not described herein. This casing is provided at each end with an appropriate stuffing box 10 and with a spring 11 which acts against the packing material 12 to aid in making a more perfect fit against a tubular piston rod 13, to be presently described. The casing is further formed with an oil and air receiving chamber 14 into which lubricant is introduced from a supply pipe 15 connected with a suitable source of supply and having a check valve 16 to prevent any return movement of the oil. This pipe 15 connects with the casing 7 and communicates with the chamber 14. An air inlet nipple 17 having a check valve 18 also communicates with the chamber 14 and permits the ingress of air on one stroke of the piston rod 13, at which time oil also is drawn into the chamber 14.

Fixed to the casing is a tubular cylinder 19 closed at its outer end 20 and open at its inner end 21 to receive the air and lubricant in the narrow clearance or space between this cylinder and the tubular piston rod 13. This rod is connected with the engine piston as seen at 22.

It will now be seen that when the engine piston 2 is reciprocated it actuates the lubricating piston 13 and causes it on the out or power stroke of the engine piston to make a suction stroke in its tubular cylinder 19 to draw lubricant and air into the mixing chamber 14. The clearance between the tubular piston 13 and its tubular cylinder 19 is approximately 25/1000 of an inch or such other dimension as will permit the mixed oil and air to pass along this clearance for the length or substantially the length of the tubular cylinder 19. After a few strokes of the tubular piston 13 the tubular cylinder 19 has received a sufficient quantity of oil and air to cause the further outward strokes of the hollow piston to force the oil and air into its longitudinal bore 22 and to deliver it into the chamber 6 and thence through the passage 5 and the clearance 4 into contact with the inner wall of the cylinder bore and thus establish lubrication therein.

The quantity of lubricant as the tubular piston 13 works back and forth becomes such that the crowding of it between the cap 20 of the cylinder 19 and the end 23 of the tubular piston causes the oil to be put under such pressure by this displacement action of the tubular piston as that the oil will pass ultimately into the clearance 4 with such pressure and effect as will overcome any then existing pressure of the power medium. As the displacement of the oil in the tubular cylinder 19 and its passage thence through the tubular piston 13 takes place when the power piston 2 is making its outward stroke, the pressure of the power medium in the cylinder though not at maximum and though more or less reduced, still it is great and has to be overcome by the lubricant. So that whatever pressure may be within the power cylinder, the lubricating oil nevertheless passes into the clearance as against such pressure; and this entrance, of course, is facilitated by the fact above stated that the entrance of the oil into the clearance 4 preferably takes place on this out stroke of the power piston.

It will be observed that my lubricating mechanism comprises, essentially, a power piston and its cylinder, a lubricating cylinder, as 19, a lubricating piston, as 13, and a casing adapted to carry the lubricating cylinder and guide its piston and also adapted to receive oil and air in a manner whereby they are brought together and the oil is aerated and fragmentized, or in effect, vaporized by the intermixture of the air therewith.

And then another factor that enters into the efficiency of my lubricating mechanism is that of the aeration of the oil by the introduction of the air which has the effect of so reducing the viscosity of the oil and so breaking up and in effect vaporizing it that it will travel through all of the attenuated spaces described, and particularly will readily enter into the clearance 4 between the power piston and its cylinder.

I desire to comprehend within my invention such modifications and changes as may be necessary to adapt it to varying conditions and uses.

Having thus fully described my invention, what I claim as new and desire to secure by Letters Patent of the United States, is:

1. In a lubricating apparatus, the combination with a power piston and its cylinder, of a casing adapted to separately receive oil and air in a manner to cause their intermixture within the casing, a lubricating cylinder secured to the casing, a lubricating piston secured to the power piston and adapted to deliver vaporized oil thereto, such lubricating piston operating in the lubricating cylinder with a clearance in excess of a working fit, whereby this piston induces the inflow of intermingled oil and air from the casing into the lubricating cylinder.

2. In a lubricating mechanism, a power cylinder and piston having a clearance slightly in excess of a working fit of such piston and cylinder, a casing adapted to separately receive oil and air for their intermixture within the casing, a tubular cylinder carried by such casing, and a tubular piston connected to the power piston adapted to work in the tubular cylinder and to draw oil and air into such cylinder through the clearance between them, and to eject this lubricant from the tubular cylinder through such tubular piston and deliver it to the clearance between the power piston and its cylinder.

3. In a lubricating apparatus, the combination with a power piston and its cylinder having a clearance space through a part of the length of the piston in excess of the working it between them, a stationary casing having oil and air inlets with check valves, and a chamber into which said ports discharge, a tubular cylinder secured to one end of said casing and adapted to receive oil and air from said chamber, a tubular piston connected with the power piston and working in the tubular cylinder with a clearance space in excess of a working fit, all for the purpose described.

4. In a lubricating mechanism, a casing having oil and air inlet ports and a mixing chamber into which they discharge, a tubular cylinder secured to said casing and adapted to receive lubricant from said chamber, and a tubular piston mounted to reciprocate in the casing and the tubular cylinder and having a clearance between it and the bore of the cylinder in excess of a working fit.

5. In a lubricating mechanism, the combination with a stationary casing having a mixing chamber and oil and air inlets leading thereto, of a tubular cylinder secured in one end of the casing and adapted to receive lubricant from said chamber, a stuffing box carried by the casing and a tubular piston adapted to reciprocate in the casing and through such stuffing box and fitted within the tubular cylinder with a clearance in excess of a working fit.

In testimony whereof, I affix my signature.

ELMER A. WATTS.